US008548434B2

(12) United States Patent
Raffle

(10) Patent No.: US 8,548,434 B2
(45) Date of Patent: *Oct. 1, 2013

(54) MESSAGING DEVICE

(76) Inventor: Hayes S. Raffle, Palo Alto, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 12/711,475

(22) Filed: Feb. 24, 2010

(65) Prior Publication Data

US 2010/0151830 A1 Jun. 17, 2010

Related U.S. Application Data

(63) Continuation-in-part of application No. 12/130,392, filed on May 30, 2008, now Pat. No. 8,442,493.

(60) Provisional application No. 61/155,142, filed on Feb. 24, 2009.

(51) Int. Cl.
H04L 12/58 (2006.01)
H04M 1/725 (2006.01)

(52) U.S. Cl.
USPC .......... 455/412.1; 455/412.2; 455/575.1; 455/566; 455/556.1; 455/556.2; 455/557; 455/414.1; 379/88.11; 379/88.12; 379/88.22; 379/88.25; 715/206; 715/207; 437/317

(58) Field of Classification Search
USPC .......... 455/575.1, 412.1, 412.2, 418–420, 455/566, 557, 556.1, 556.2, 90.3, 414.4, 455/413; 379/88.11, 88.12
See application file for complete search history.

(56) References Cited

U.S. PATENT DOCUMENTS

| 4,748,756 | A | 6/1988 | Ross |
| 5,184,971 | A | 2/1993 | Williams |
| 5,313,235 | A | 5/1994 | Inoue |
| 5,390,236 | A | 2/1995 | Klausner et al. |
| 5,483,580 | A | 1/1996 | Brandman et al. |
| 5,520,544 | A | 5/1996 | Manico et al. |
| 5,524,140 | A | 6/1996 | Klausner et al. |
| 5,651,049 | A | 7/1997 | Easterling et al. |
| 5,701,258 | A | 12/1997 | Harris et al. |
| 5,751,793 | A | 5/1998 | Davies et al. |
| 5,848,356 | A | 12/1998 | Jambhekar et al. |
| 5,907,604 | A | 5/1999 | Hsu |
| 5,956,682 | A | 9/1999 | Loudermilk et al. |
| 6,064,855 | A | 5/2000 | Ho |
| 6,185,851 | B1 | 2/2001 | Loudermilk et al. |
| 6,196,893 | B1 | 3/2001 | Casola |
| 6,393,402 | B1 | 5/2002 | Loudermilk et al. |
| 6,427,078 | B1* | 7/2002 | Wilska et al. .............. 455/550.1 |

(Continued)

OTHER PUBLICATIONS

U.S. Appl. No. 12/130,392 Non-Final Office Action mailed Sep. 16, 2011, 13 pages.

(Continued)

Primary Examiner — Marceau Milord
(74) Attorney, Agent, or Firm — Brake Hughes Bellermann LLP

(57) ABSTRACT

An apparatus may include a housing that is configured to support a picture, a sensor that is configured to receive an input and that is associated with the picture, a communication module that is configured to communicate with a remote device and to retrieve audio messages from the remote device, a speaker that is configured to play the audio messages, an electronics control module that is configured to control playing of the audio messages that are designated as being associated with the picture in response to selection of the sensor, and a power module.

24 Claims, 3 Drawing Sheets

(56) References Cited

U.S. PATENT DOCUMENTS

| | | |
|---|---|---|
| 6,513,836 B2 | 2/2003 | Li |
| 6,659,835 B1 | 12/2003 | Allen |
| 6,975,832 B2 | 12/2005 | Adams et al. |
| 7,027,808 B2 * | 4/2006 | Wesby .................. 455/419 |
| 7,593,605 B2 * | 9/2009 | King et al. .................. 382/313 |
| 7,812,860 B2 * | 10/2010 | King et al. ............... 348/210.99 |
| 8,098,319 B2 * | 1/2012 | Demuynck .................. 348/335 |
| 8,121,652 B2 * | 2/2012 | Rider et al. .................. 455/566 |
| 2006/0212831 A1 | 9/2006 | Fogg |
| 2009/0252305 A1 | 10/2009 | Rohde |
| 2009/0254829 A1 * | 10/2009 | Rohde .......................... 715/727 |
| 2009/0298556 A1 | 12/2009 | Raffle |

OTHER PUBLICATIONS

Notice of Allowance received for U.S. Appl. No. 12/130,392, mailed on Jun. 12, 2012, 7 pages.

Office Action Response filed for U.S. Appl. No. 12/130,392, filed on Mar. 16, 2012, 18 pages.

* cited by examiner

MESSAGING DEVICE

CROSS REFERENCE TO RELATED APPLICATIONS

This is a continuation-in-part of U.S. patent application Ser. No. 12/130,392, filed May 30, 2008, entitled "Messaging Device." This application also claims priority under 35 U.S.C. §119 to Provisional Patent Application No. 61/155,142, filed Feb. 24, 2009, titled "Messaging Device." Each of the aforementioned applications is incorporated herein by reference in its entirety.

TECHNICAL FIELD

This description relates to a messaging device.

BACKGROUND

Telecommunications technologies, such as the telephone and internet services, allow people to connect with each other remotely. For example, these technologies enable families and loved ones to share voice messages, media and data using telecommunications networks. Some of these technologies may be more geared and appropriate for adults and older children and they may not be geared toward younger children, including babies and infants.

SUMMARY

In a first general aspect, an apparatus includes a housing that is arranged and configured to support a picture and a sensor that is arranged and configured to receive an input and that is associated with the picture. A communication module includes an interface and that is arranged and configured to retrieve audio messages from a remote device using the interface, and a speaker is arranged and configured to play the audio messages. An electronics control module is operably coupled to the sensor, the speaker, and the communication module. The electronics control module includes a mailbox that associates the audio messages designated for the mailbox with the sensor, and the electronics control module is arranged and configured to control playing of the audio messages associated with the mailbox in response to selection of the sensor. A power module is operably coupled to the electronics control module and is configured to provide power to the electronics control module.

In another general aspect, an apparatus includes a housing that is arranged and configured to support a picture and a sensor that is arranged and configured to receive an input and that is associated with the picture. A radio module is arranged and configured to communicate with a remote device and to retrieve audio messages from the remote device. A speaker is arranged and configured to play the audio messages. An electronics control module is operably coupled to the sensor, the speaker, and the radio module and is arranged and configured to control playing of the audio messages that are designated as being associated with the picture in response to selection of the sensor. A power module is operably coupled to the electronics control module and is configured to provide power to the electronics control module.

In another general aspect, a system includes a messaging device and a remote device. The messaging device includes a housing that is arranged and configured to support a picture, a sensor that is arranged and configured to receive an input and that is associated with the picture, a radio module that is arranged and configured to communicate with the remote device and to retrieve audio messages from the remote device, and a speaker that is arranged and configured to play the audio messages. An electronics control module is operably coupled to the sensor, the speaker, and the radio module and is arranged and configured to control playing of the audio messages that are designated as being associated with the picture in response to selection of the sensor. A power module that is operably coupled to the electronics control module and that is configured to provide power to the electronics control module.

The details of one or more implementations are set forth in the accompanying drawings and the description below. Other features will be apparent from the description and drawings, and from the claims.

DETAILED DESCRIPTION

Figure 1:
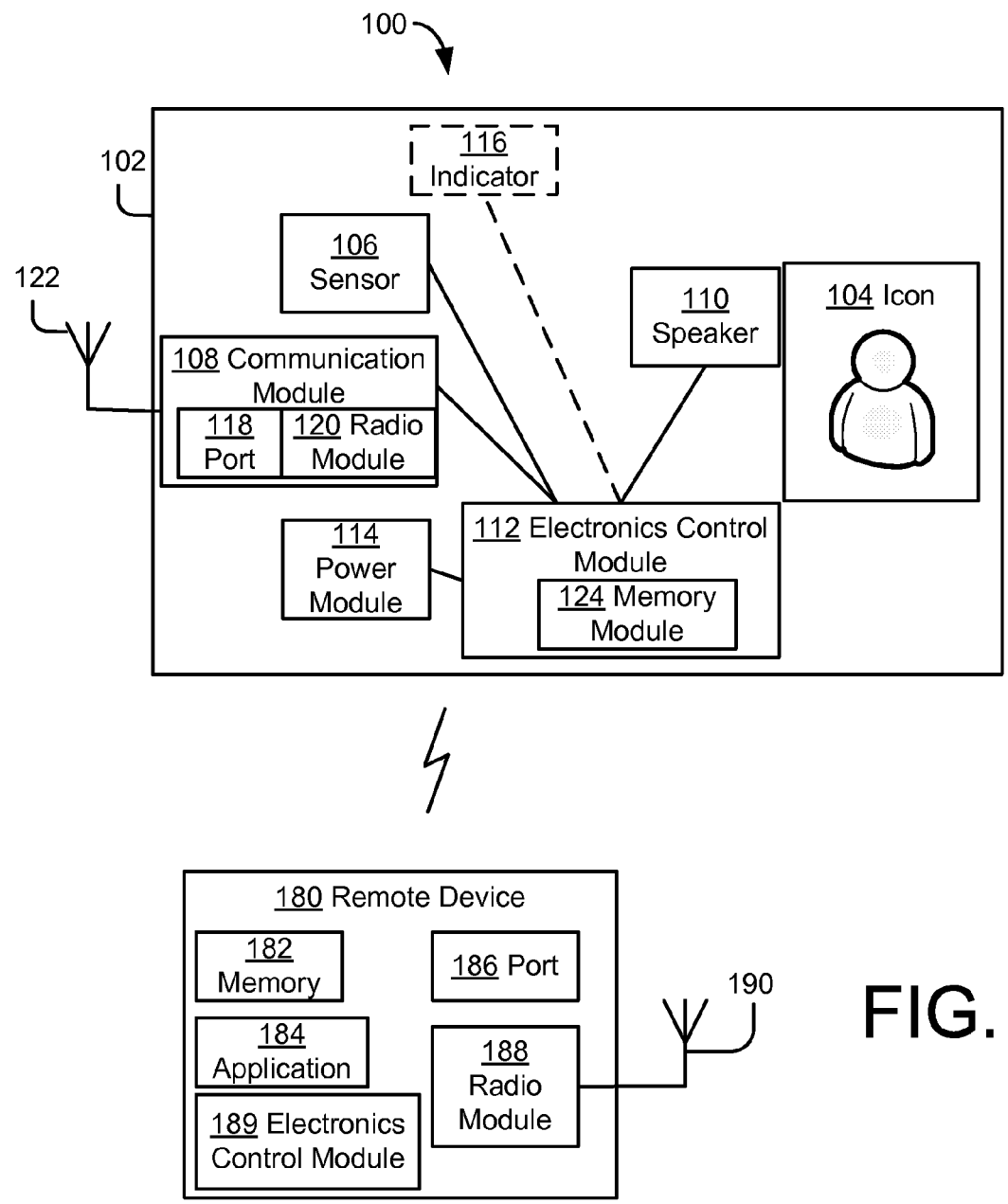
FIG. 1 is an exemplary block diagram of an implementation of a messaging device.

FIG. 1 is an exemplary block diagram of a messaging device 100. The messaging device 100 may include a housing 102 that is arranged and configured to support an icon 104, a sensor 106, an communication module 108, a speaker 110, an electronics control module 112 and a power module 114. The messaging device 100 also may optionally include an indicator 116.

In one exemplary implementation, the housing 102 may be arranged and configured to support the icon 104, the sensor 106, the communication module 108, the speaker 110, the electronics control module 112, the power module 114, and the indicator 116. For example, the housing 102 may be configured to substantially enclose the communication module 108, the speaker 110, the electronics control module 112 and the power module 114. The housing 102 may be configured to support the icon 104, the sensor 106 and the indicator 116 such that at least a portion of the icon 104, the sensor 106 and the indicator 116 is visible to a user viewing the housing 102. The housing 102 may be configured to include one or more perforations in the area around or near the speaker 110 such that sound emanating from the speaker 110 may penetrate the housing 102 through the perforations. In one exemplary implementation, the sensor 106 may not be visible to the user such. For example, the sensor 106 may be located beneath the icon 104.

In one exemplary implementation, the housing 102 may be a book that is arranged and configured to support the icon 104. For example, the housing 102 may be a board book with cardboard-type pages, a picture book, a photo album, a soft fabric photo album, combinations of these types of books or any other type of book. In one exemplary implementation, the housing 102 may be a book having a single page that supports a single icon 104 on one side or the book may be a single page that supports multiple icons 104. In another exemplary implementation, the housing 102 may be a book having a single page that supports multiple icons 104. In another exemplary implementation, the housing 102 may be a book having multiple pages that support multiple icons 104.

The icon 104 may include a single icon or may include multiple icons (e.g., multiple icons of the same things, multiple icons of different things or a combination of the two).

The icon 104 may be a persistent icon or may be an icon that can be changed or updated. In one exemplary implementation, the icon 104 may be a picture that is supported in the housing 102. For example, the picture may be an image, a digital image, a printed photograph, a digital photograph, a combination of these types of pictures or any other type of picture.

In one exemplary implementation, the housing 102 may be a book and the icon 104 may be a picture, such as a photograph. For example, the book may be configured to support the photograph by holding the photograph on a page in the book. The book may hold the photograph in any one of many different ways. For instance, the book may include a clear sleeve or envelope into which the photograph may be slid and, thus, supported in the book. The book may include multiple pages on which to hold multiple pictures such as, for example, multiple photographs. The pages in the book may be configured to hold more than one photograph on each page and/or may be configured to hold a single photograph on each page. The pages of the book may be configured to hold one or more photographs on each side of the page.

In one exemplary implementation, the housing 102 may be a picture frame that is configured to support the icon 104. For example, the housing 102 may be a picture frame have a single space to hold the icon 104 such as, for example, a picture or a photograph. In one exemplary implementation, the housing 102 may be a picture frame having multiple spaces to hold multiple icons 104 such as, for example, multiple pictures or photographs. The housing 102 may be a digital picture frame having one or more digital surfaces that are configured to hold multiple icons 104 such as, for example, one or more digital pictures.

In another exemplary implementation, the housing 102 may be a box that is configured to support the icon 104. For example, the box may support one or more icons 104 that are visible when the box is opened. In this manner, the box may house the icons 104 on the inside that are visible and displayed when the box is opened.

In another exemplary implementation, the housing 102 may be a plush toy that is configured to support the icon 104. For example, the plush toy may be a plush doll, plush animal or other plush figure that is configured to support one or more icons 104. In other exemplary implementations, the housing 102 may be any other type of toy that may be configured to support one or more icons 104.

In one exemplary implementation, the sensor 106 may include one or more sensors. The sensor 106 may correspond to and be associated with a particular icon 104. For example, a single sensor 106 may correspond to and be associated with a single icon 104. Similarly, multiple sensors 106 may correspond on a one-to-one basis with multiple icons 104. Additionally and/or alternatively, a single sensor 106 may correspond to multiple icons 104, where the multiple icons 104 are representations of a same thing. For instance, the housing 102 may be a book and a single page in the book may include more than one icon 104 of the same thing such as, for example, more than one photograph of the same person. In this instance, the sensor 106 would correspond to the group of icons 104 on this page in the book.

In another exemplary implementation, a single sensor 106 may correspond to multiple different icons 104. For example, the housing 102 may be a book with multiple different icons 104 such as, for instance, multiple photographs of different people. In this instance, the single sensor 106 may correspond to each of the different photographs.

In one exemplary implementation, the sensor 106 may be operably coupled to the electronics control module 112. The sensor 106 may be configured to receive an input and to be associated with one of the icons 104. For instance, the sensor 106 may include a button that is configured to receive an input such as, for example, a touch or a push by a user, where the sensor 106 is associated with an icon 104 such as, for example, a picture or photograph. The input may include a touch or a push by any object such as, for example, a pen, a stick, a pencil or any other type of object.

In one exemplary implementation, the sensor 106 may be a two state sensor having an on state and an off state. In other exemplary implementations, the sensor 106 may include a single state or may include more than two states.

As discussed above, the sensor 106 may include multiple sensors 106. For instance, a first sensor 106 may be a first button that is configured to receive a first input and that is associated with a first icon 104 and a second sensor 106 may be a second button that is configured to receive a second input and that is associated with a second icon 104. In one exemplary implementation, the housing 102 may be a book and the sensors 106 may be buttons. The book may include rigid pages to secure the buttons and to isolate presses of a first button a first page of the book from presses of a second button on a second page of the book.

In another exemplary implementation, the sensor 106 may include a sensor that is configured to sense the opening of a book or box and/or to sense the turning of one page to another page in a book or box. For example, the sensor 106 may include one or more plunger buttons that are configured to sense the opening of a book or box and/or to sense the turning of one page to another page in a book or a box. In another example, the sensor 106 may include one or more magnetic sensors that are configured to sense the opening of a book or box and/or to sense the turning of one page to another page in a book or a box.

In another exemplary implementation, the sensor 106 may include a combination of sensors that are configured to sense the opening of a book, a box, or a keyed object that distinguishes the association of the sensor. For example, one sensor may be a button in a cover of a book and other sensors may be switches that are connected to the pages of the book to know what page the book is opened to. Icons 104 may be affixed to the right hand pages of the book and touching any page may push through the pages beneath it, thus depressing the button. The button may be indexed with the switches in the pages.

In another exemplary implementation, pages in a book may not be attached to a binding. Essentially, the pages may be similar to puzzle pieces and the puzzle pieces may be indexed to sensors 106, where the sensors 106 are switches that are configured to sense when the pieces are inserted in the book. Pushing the pieces may create a unique combination of button presses to the system. An arrangement of pieces may be arranged to display an icon 104 such as, for example, a puzzle photograph of a person.

In another exemplary implementation, the sensor 106 may include a touch sensor such as, for example, an electrostatic sensor, a touch screen or other type of touch sensor. For example, the sensor 106 may be an electrostatic sensor that is activated, for example, by the touch of a person. The electrostatic sensor may be configured to pickup a known frequency that the source of the likely sensor input generates. For instance, the electrostatic sensor may include an electrode that is configured to pick up 60 Hz, which would correspond to a person touching the sensor.

In one exemplary implementation, the housing 102 may be a book having one or more flexible pages that support one or more icons 104, where the icons 104 may be photographs. The sensor 106 may include one or more electrostatic sensors, where each photograph 104 is associated with a respective electrostatic sensor 106 such that the touch of a photograph activates the electrostatic sensor. The book, the photographs 104 and the electrostatic sensors 106 may be flexible and the electrostatic sensors 106 may be configured to sense both sides of a page individually. The electrostatic sensors 106 may be configured to sense facing pages individually. The electrostatic sensors 106 also may be configured to avoid interference when the book is closed or dropped or when the pages of the book are turned.

The communication module 108 may be arranged and configured to retrieve an audio message that is associated with a particular icon 104 and/or a particular sensor 106. In one exemplary implementation, the communication module 108 may be configured to retrieve one or more audio messages, where the audio messages are associated with one or more icons 104 and/or one or more sensors 106. The communication module 108 may be configured to retrieve the audio messages from a remote device 180.

The remote device 180 may include a computer device such as, for example, a personal computer (e.g., a desktop computer or a laptop computer), a server, a networked computer component (e.g., a base station device networked to another computer device) or other type of computing device. The remote device 180 also may include a telephone device, a cellular telephone device, an answering machine, or a combination of any of these devices.

The remote device 180 may be configured to receive audio messages such as, for example, voicemails. The audio messages may be received in a variety of different ways. For instance, the audio messages may be received through a telephone line or a cellular modem that may be part of the remote device 180. A person may call a telephone number associated with the remote device 180 and leave a voicemail on the remote device 180.

In another example, the audio messages may be received through the Internet, including through email, Internet telephone services and/or through using voice over Internet Protocol (VoIP). For instance, a person may use the Internet to leave an audio message, such as a voicemail, that may be stored on the remote device 180. The person may access a website that has been designated for communicating audio messages that are destined for the messaging device 100.

The remote device 180 may include a memory module 182 to store the audio messages in an audio file. The remote device also may include an application module 184 that includes one or more applications. For example, the application module 184 may include a voicemail application that may be configured to include one or more separate voice mailboxes. In one exemplary implementation, the voicemail application may include a single, dedicated voice mailbox for the messaging device 100. In one exemplary implementation, multiple voice mailboxes may be configured to correspond to multiple recipients of the voicemail, including a voice mailbox designated for the messaging device 100.

In one exemplary implementation, the voicemail application may be configured to have one or more voice mailboxes that correspond to one or more designated audio message senders, where each audio message sender corresponds to an icon 104 and an associated sensor 106. The voicemail application may be configured such that the audio message sender may enter a specific choice to access their particular audio mailbox to leave an audio message. A unique access code may be used to enter a specific mailbox and to leave an audio message in that specific mailbox.

As discussed above, the communication module 108 may be configured to retrieve the audio messages designated for the messaging device 100 from the remote device 180. For example, the communication module 108 may include an interface such as, for example, a port 118 that enables the messaging device 100 to physically connect and disconnect from the remote device 180 to retrieve the audio messages. The remote device 180 also may include a port 186 to make the connection to the messaging device 100. The port 118 may include a universal serial bus (USB) port, a serial port, an Ethernet port, and/or a standard telephone jack port.

In another exemplary implementation, the communication module 108 may include a radio module 120 and an antenna 122. In one exemplary implementation, the radio module 120 may be configured to retrieve the audio messages from the remote device 180, which also may include a radio module 188 and an antenna 190. The radio module 120 may include a Bluetooth module, a wireless communication card (e.g., an 802.11-configured card), or other type of wireless communication module.

In another exemplary, the communication module 108 may be configured such that it receives the audio messages directly without having to retrieve the audio messages from the remote device 180. For instance, the communication module 108 may include a cellular modem that is associated with a phone number and that may receive audio messages directly. The communication module 108 may be configured to include other telephony devices that are capable of directly receiving incoming audio messages.

The remote device 180 may include an electronics control module 189 that may be arranged and configured to control the functioning and features of the remote device 180 and the other components of the remote device 180. The electronics control module 189 may include a processor or other type of controller.

The speaker 110 may be arranged and configured to play the audio messages. As discussed above, the speaker 110 may be substantially enclosed in the housing 102. In one exemplary implementation, the housing 102 may be a book, as discussed above, and the speaker 110 may be located in or near the spine of the book. The speaker 110 also may be located in other locations with the book.

The electronics control module 112 may be operably coupled to the sensor 106, the communication module 108, the speaker 110, the power module 114 and the indicator 116. The electronics control module 112 may include a processor that may be configured to control the playing of the audio messages in response to a selection of one or more of the sensors 106. In this manner, when the sensor 106 is selected, the electronics control module 112 plays at least one of the audio messages associated with the sensor 106 and a corresponding icon 104. New audio messages that have not been played may be played first. If there are no new audio messages, then the electronics control module 112 may randomly select previously played audio messages.

The electronics control module 112 also may be configured to control when the indicator 116 is turned on and turned off. The indicator 116 may include one or more indicators 116, where each indicator may be associated with a designated icon 104 and/or a designated voice mailbox. In one exemplary implementation, the indicator 116 may be a light emitting diode (LED). The LED may be controlled by the electronics control module 112 such that the LED is turned on when there is a new audio message that has been left for the corresponding icon 104. The LED may be controlled by the electronics control module 112 such that the LED is turned off when the new audio message has been listened to.

In one exemplary implementation, the electronics control module 112 may be configured to include one or more voice mailboxes. For example, the electronics control module 112 may include a processor that may be configured to set up one or more voice mailboxes. In this implementation, the electronics control module 112 may include a memory module 124 to store any retrieved and/or received audio messages. For instance, a first mailbox may be assigned to a caller that is associated with a first icon 104 and a first sensor 106 and a second mailbox may be assigned to a caller that is associated with a second icon 104 and a second sensor 106. When an audio message that is designated for the first mailbox is retrieved, the electronics control module 112 may turn on a first indicator 116 associated with the first mailbox and then play the audio message in response to a selection of the first sensor 106. After the audio message is played, the electronics control module 112 may turn off the first indicator 116. In response to subsequent selections of the first sensor 106, the electronics control module 112 may play the audio message again or may play any other previously retrieved audio message that is in the first mailbox.

Although the memory module 124 is illustrated in FIG. 1 as part of the electronics control module 112, the memory module 124 may be a separate component that is operably coupled to the electronics control module 112. In addition to being configured to store audio messages, the memory module 124 also may be configured to store other information such as, for example, applications, instructions, computer programs and any other type of information. Furthermore, the memory module 124 may include multiple memory modules that are either separate components of the messaging device 100 or included as part of the other components of the messaging device 100.

Similarly, when an audio message that is designated for the second mailbox is retrieved, the electronics control module 112 may turn on a second indicator 116 associated with the second mailbox and then play the audio message in response to a selection of the second sensor 106. After the audio message is played, the electronics control module 112 may turn off the second indicator 116. In response to subsequent selections of the second sensor 106, the electronics control module 112 may play the audio message again or may play any other previously retrieved audio message that is in the second mailbox, in random order or otherwise.

In another exemplary implementation, the electronics control module 112 may not include the voice mailboxes, because any voice mailboxes may be configured on the remote device 180. In this example, the electronics control module 112 may not include a memory module, because the audio messages may be stored on the remote device 180 and retrieved by the communication module 108 in a streaming manner using the radio module 120. The electronics control module 112 may be configured to control playing of the audio messages that are designated as being associated with the first icon 104 in response to selection of the first sensor 106. When the first sensor 106 is selected, the electronics control module 112 may cause the communication module 108 through the radio module 120 to retrieve and play an audio message that is associated with the first icon 104 and the first sensor 106 from the remote device 180. Alternatively, the electronics control module 112 may include the memory module 124 to store the retrieved audio messages locally at the messaging device 100. Additionally and/or alternatively, the communication module 108 may retrieve the audio messages using the port 118 such that the messaging device 100 retrieves the audio messages through a hard wire instead of wirelessly.

In one exemplary implementation, a single sensor 106 may be associated with multiple different icons 104, with each different icon 104 having its own indicator 116. In this example, the electronics control module 112 may be configured to play the audio messages associated with a first icon 104 upon selection of the single sensor 106. The electronics control module 112 also may be configured to turn on a first indicator 116 that is associated with the first icon 104 when an audio message associated with the first icon 104 is played. The electronics control module 112 may be configured to play the audio messages associated with the other icons 104 upon subsequent selections of the single sensor 106 and to turn on an associated indicator 116 when an audio message is played. In this manner, the electronics control module 112 may play the audio messages associated with the different icons 104 in response to the selection of the single sensor 106.

The power module 114 may be configured to provide power to one or more of the components of the messaging device 100 including the electronics control module 112, the communication module 108, the sensor 106, the indicator 116 and the speaker 110. The power module 114 may include one or more batteries for providing power to the components. The batteries may be rechargeable batteries (e.g., lithium ion rechargeable batteries) or non-rechargeable batteries. If rechargeable batteries are included, the batteries may be recharged, for example, when the messaging device 100 is hard wired to the remote device 180 using the ports 118 and 186. The rechargeable batteries also may be recharged by including an AC adapter that connects the messaging device to a power outlet and/or by including a separate recharger for removable, rechargeable batteries.

Figure 2:
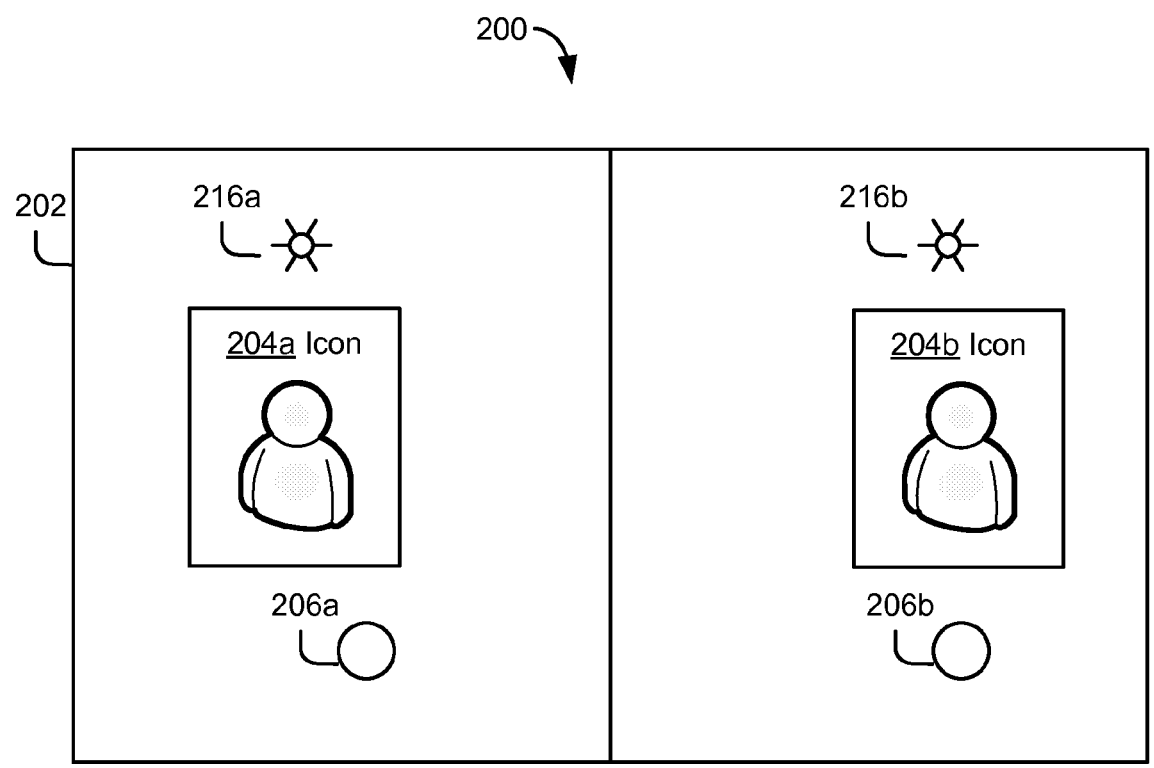
FIG. 2 is an exemplary block diagram of an implementation of a messaging device.

Referring to FIG. 2, an exemplary messaging device 200 is illustrated. The messaging device 200 may include the features and functionality as described above with respect to the messaging device 100 of FIG. 1. The messaging device 200 may include a housing 202, a first icon 204a, a second icon 204b, a first sensor 206a, a second sensor 206b, a first indicator 216a and a second indicator 216b. The messaging device 200 also may include the other components from the messaging device 100 including the communication module 108 having a port 118 and/or a radio module 120, a speaker 110, an electronics control module 112 having a memory 124, and a power module 114. These other components are not illustrated in FIG. 2 because they may be substantially enclosed within the housing 202. The components of the messaging device 200 may include all of the features and functionality of the corresponding components of messaging device 100 of FIG. 1.

In this example messaging device 200, the housing 202 may be a book having multiple pages with at least a place to support the first icon 204a and the second icon 204b. The book may be a hard-paged book such as a hard-paged book with rigid pages for an infant or a toddler. The hard-paged book may support an implementation where buttons are used for the first sensor 206a and the second sensor 206b. Alternatively, the book may be soft fabric cloth book with flexible pages. The soft fabric cloth book may support an implementation where touch sensors (e.g., electrostatic sensors) are used for the first sensor 206a and the second sensor 206b.

In this implementation, the book may be designed to include pictures of family members such as, for example, pictures of grandparents. The book may be suitable for use by anyone, but may be specifically designed for use by a young child including babies, infants and toddlers. A picture of a grandparent may be the first icon 204a and a picture of another grandparent may be the second icon 204b. While only two icons are illustrated in this exemplary implementation, it is understood that more than two icons and corresponding components (e.g., sensors and indicators) may be included in the book. The messaging device 200 may be configured such that each grandparent may leave audio messages for the young child that are associated with the corresponding grandparent. The young child may play the audio messages from that grandparent by selecting the sensor 206a or 206b that is associated with that particular grandparent. The indicators 216a and 216b may be LEDs that are turned on when there is a new message from a particular grandparent. As discussed above, the LEDs may be controlled by the electronics control module 112.

The grandparents may leave audio messages for the young child in various different ways. For example, the grandparents may call a telephone number, which may be the young child's residential telephone number, and then may enter a voice mailbox system. Each grandparent may have a separate voice mailbox, where each separate voice mailbox corresponds to their particular icon, sensor and indicator. As discussed above, the voice mailbox system may reside on a remote device (e.g., remote device 180 of FIG. 1) or may be a part of the configuration of the electronics control module 112. If the voice mailbox system resides on the remote device, then the communication module 108 may retrieve the audio messages using the port 118 and/or the radio module 120. The audio messages may be periodically downloaded or may be streamed to the messaging device 200. If the voice mailbox system is part of the electronics control module 112, then the communication module 108 may be connected to the remote device (e.g., a telephone) and record the audio message into the voice mailboxes on the electronics control module.

In another example, the grandparents may send an audio message to the young child using the Internet. For instance, the grandparents may access a designated website that enables them to record the audio message and the file is sent to the remote device. In this example, the remote device 180 may be connected to the Internet and may not necessarily be connected to a telephone network. The communication module 108 may retrieve the audio messages, as described above.

In this example, there may be multiple remote devices such as, for example, multiple remote devices 180. A first remote device 180 may include a voicemail server on the Internet that may be accessed through a designated website or through telephone voice networks. A second remote device 180 may be located in a user's home and may be configured to operate like an answering machine and may be configured to communicate with the first remote device 180. The messaging device 100 may then wirelessly communicate with the second remote device 180 to retrieve audio messages that have been left by a person (e.g., a grandparent) through the first remote device 180.

In this example, feedback may be provided to the grandparent through the Internet. For example, the electronics control module 112 may be configured to automatically generate an electronic message that indicates the child is listening or has listened to the audio message. The electronic message may be communicated by the communication module 108 to the remote device for further communication back to the grandparent either through an email, or a message on a website, or by other means. In another exemplary implementation, the messaging device 200 may include a microphone (not shown). The microphone may be operably coupled to the electronics control module 112, which may be configured to enable the young child to record a reply message to the grandparent. The electronics control module 112 may record the reply message using the microphone and the communication module may communicate it to the remote device for further communication back to the grandparent (e.g., using the Internet).

Figure 3:
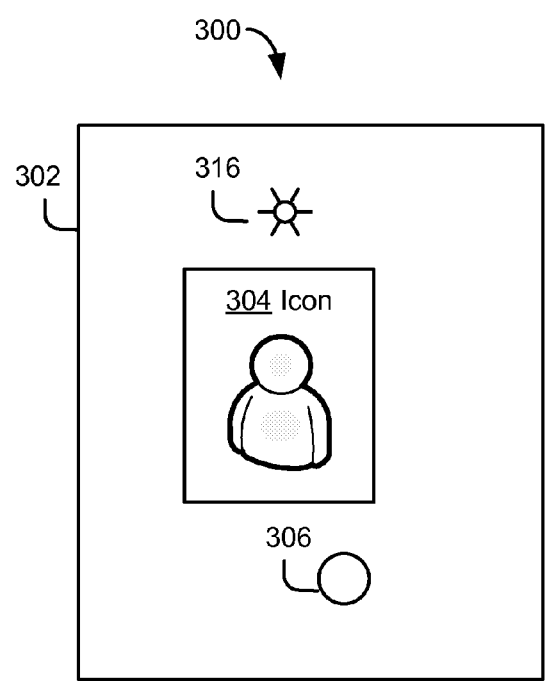
FIG. 3 is an exemplary block diagram of an implementation of a messaging device.

Referring to FIG. 3, another exemplary messaging device 300 is illustrated. The messaging device 300 may include the features and functionality as described above with respect to the messaging device 100 of FIG. 1. The messaging device 300 can be similar to the device 200, except that the device 300 has a single icon 304, rather than a plurality of icons 204a and 204b. Thus, the messaging device 300 may include a housing 302, an icon 304, a sensor 306, and an indicator 316. The messaging device 300 also may include the other components from the messaging device 100 including the communication module 108 having a port 118 and/or a radio module 120, a speaker 110, an electronics control module 112 having a memory 124, and a power module 114. These other components are not illustrated in FIG. 3 because they may be substantially enclosed within the housing 302. The components of the messaging device 300 may include all of the features and functionality of the corresponding components of messaging device 100 of FIG. 1.

In this example messaging device 300, the housing 302 may take the form of, for example, a greeting card, a toy, an action figure, or a photo frame that includes at least a place to support the icon 304. When the housing takes the form of a photo frame, the housing may include a hard plastic frame that can be used to display one or more photographs. For example, a printed photograph may be placed into the frame, or, if the frame is an electronic frame, one or more photographs can be uploaded into the frame. The frame may support an implementation where a button is used for the sensor 306. Alternatively, when the housing 302 takes the form of a toy, the toy can have, for example, a soft, plush outer covering. The toy can include a thin clear plastic sleeve over a portion of the outer covering under which a photograph may be slipped. The soft fabric toy may support an implementation where touch sensors (e.g., electrostatic sensors) are used for the sensor 306. For example, a grandparent may give such a toy to a grandchild with a picture of the grandparent under the sleeve. The grandparent then can call the phone number of the grandchild's parents (or otherwise contact the toy using the various techniques described above) to leave a recorded message on the toy for the grandchild to hear, and an indicator 316 can be turned on to indicate the presence of a new message. When a message has been recorded, the grandchild's parents can play the message for the grandchild and while they talk about who the grandparents are. The grandchild can play the recordings all by herself by touching the sensor 306 to play the message(s).

In another implementation, the housing 302 can take the form of a doll or an action figure (e.g., a figure that is designed and configured to look like a well-known character or like a person who may send messages to the device 300). For example, a user may purchase a personalized action figure that is customized to look like himself or someone he knows and then send the action figure to a recipient that receives messages from the person that the action figure is customized to look like.

In another implementation, the housing 302 can take the form of a greeting card, which may be purchased by a first user and sent to a second user. The first user then can send messages to the second user for receipt and playback by the device 300. For example, the first user by navigate to a website that takes orders for greeting card, and the first user may purchase a greeting card and upload a picture of herself to the website for inclusion on the greeting card. The first user also can select or create a written or audio message for inclusion on the greeting card. A greeting card then can be created or customized by the operator of the website to include a photograph or other representation of the first user, and then can be sent to the second user. The first user then can call a designated phone number at any time to add a new voice message to the card, which the second user can play by touching a sensor 306 associated with the photograph 304 that had been uploaded by the first user. In other implementations, the housing 302 could take the form of a locket, a box, a refrigerator magnet, etc.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus, comprising:
a housing that is arranged and configured to support a photograph of a person;
a sensor that is arranged and configured to receive an input and that is associated with the photograph;
a communication module that includes an interface and that is arranged and configured to retrieve audio messages from a remote device using the interface;
a speaker that is arranged and configured to play the audio messages;
an electronics control module that is operably coupled to the sensor, the speaker and the communication module, the electronics control module comprising:
a mailbox that associates the audio messages designated for the mailbox with the sensor, and
wherein the electronics control module is arranged and configured to:
control playing of the audio messages associated with the mailbox in response to selection of the sensor; and
a power module that is operably coupled to the electronics control module and that is configured to provide power to the electronics control module.

2. The apparatus of claim 1 wherein the housing includes a book that is arranged and configured to support the photograph.

3. The apparatus of claim 1 wherein the housing includes a soft fabric photo album that is arranged and configured to support the photograph.

4. The apparatus of claim 1 wherein the housing is selected from a group consisting of a single frame, a single board and a single page that is arranged and configured to support the photograph.

5. The apparatus of claim 1 wherein:
the sensor includes a button that is arranged and configured to receive the input and that is associated with the photograph.

6. The apparatus of claim 1 wherein:
the sensor includes a touch sensor that is arranged and configured to receive the input and that is activated when the photograph is touched.

7. The apparatus of claim 1 wherein:
the remote device includes a telephone; and
the interface of the communication module includes a telephone interface that is arranged and configured to retrieve the audio messages from the telephone.

8. The apparatus of claim 1 wherein the electronics control module includes an answering machine processor that is arranged and configured to include the mailbox and memory for storing the audio messages.

9. The apparatus of claim 1 wherein the electronics control module is further arranged and configured to:
control playing the audio messages associated with the mailbox by playing new audio messages first, if any, and then by randomly playing previously played audio messages in response to selection of the sensor.

10. The apparatus of claim 1 further comprising:
a light emitting diode that is associated with the mailbox and that is arranged and configured to illuminate when the mailbox receives a new audio message.

11. The apparatus of claim 1 wherein the power module includes a battery.

12. An apparatus, comprising:
a housing that is arranged and configured to support a photograph of a person;
a sensor that is arranged and configured to receive an input and that is associated with the photograph;
a radio module that is arranged and configured to communicate with a remote device and to retrieve audio messages from the remote device;
a speaker that is arranged and configured to play the audio messages;
an electronics control module that is operably coupled to the sensor, the speaker and the radio module and that is arranged and configured to:
control playing of the audio messages that are designated as being associated with the photograph response to selection of the sensor, and
a power module that is operably coupled to the electronics control module and that is configured to provide power to the electronics control module.

13. The apparatus of claim 12 wherein the housing includes a book that is arranged and configured to support the photograph.

14. The apparatus of claim 12 wherein the housing includes a soft fabric photo album that is arranged and configured to support the photograph.

15. The apparatus of claim 12 wherein the housing is selected from a group consisting of a single frame, a single board, and a single page that is arranged and configured to support the photograph.

16. The apparatus of claim 12 wherein:
the sensor includes a button that is arranged and configured to receive the input and that is associated with the photograph.

17. The apparatus of claim 12 wherein:
the sensor includes a touch sensor that is arranged and configured to receive the input and that is activated when the photograph is touched.

18. The apparatus of claim 12 wherein the radio module includes a Bluetooth module that is arranged and configured to communicate with the remote device and to retrieve the audio messages from the remote device.

19. The apparatus of claim 12 wherein:
the remote device includes a network server; and
the radio module is arranged and configured to communicate with the network server and to retrieve the audio messages from the network server.

20. The apparatus of claim 12 wherein:
the remote device includes an answering machine processor; and
the radio module is arranged and configured to communicate with the answering machine processor and to retrieve the audio messages from the answering machine processor.

21. The apparatus of claim 12 further comprising:
a light emitting diode that is associated with the photograph and that is arranged and configured to illuminate when the radio module retrieves a new audio message that is associated with the photograph.

22. A system, comprising:
a messaging device; and
a remote device, wherein the messaging device includes:
a housing that is arranged and configured to support a photograph of a person;
a sensor that is arranged and configured to receive an input and that is associated with the photograph;
a radio module that is arranged and configured to communicate with the remote device and to retrieve audio messages from the remote device;
a speaker that is arranged and configured to play the audio messages;
an electronics control module that is operably coupled to the sensor, the speaker and the radio module and that is arranged and configured to:
control playing of the audio messages that are designated as being associated with the photograph in response to selection of the sensor; and
a power module that is operably coupled to the electronics control module and that is configured to provide power to the electronics control module.

23. The system of claim 22 wherein the remote device includes:
a radio module that is arranged and configured to communicate with the messaging device; and
an answering machine processor that is arranged and configured to receive the audio messages and to separate the audio messages into one or more mailboxes that are each associated with a sender of the audio messages.

24. The system of claim 22 wherein the remote device includes:
a radio module that is arranged and configured to communicate with the messaging device; and
a network server that is arranged and configured to receive the audio messages and to separate the audio message into one or more mailboxes that are each associated with a sender of the audio messages.

* * * * *